United States Patent [19]

Fitzgerald

[11] Patent Number: 4,969,555

[45] Date of Patent: Nov. 13, 1990

[54] TREE BRANCH CORSET AND METHOD OF ATTACHMENT TO A GROWING TREE

[76] Inventor: Michael H. Fitzgerald, 1403 Stove Prairie Rd., Bellvue, Colo. 80512

[21] Appl. No.: 378,067

[22] Filed: Jul. 11, 1989

[51] Int. Cl.$^5$ ............................................. A01G 13/02
[52] U.S. Cl. .......................................... 206/423; 47/21
[58] Field of Search ................... 47/20, 21, 30, 31, 72, 47/84; 206/423; 141/108, 337, 338; 53/253, 255

[56] References Cited

U.S. PATENT DOCUMENTS

| | | | |
|---|---|---|---|
| 2,720,055 | 10/1955 | Morris | 53/255 X |
| 2,781,011 | 2/1957 | Dilar | 206/423 |
| 3,249,140 | 5/1966 | Jackson | 206/423 |
| 3,358,418 | 12/1967 | Manetta | 53/255 |
| 3,445,985 | 5/1969 | Manetta | 53/255 X |
| 4,054,166 | 10/1977 | Burke | 206/423 |

FOREIGN PATENT DOCUMENTS 2751975  5/1979  Fed. Rep. of Germany .......... 47/21

Primary Examiner—Henry E. Raduazo
Assistant Examiner—Jerold D. Johnson
Attorney, Agent, or Firm—William E. Hein

[57] ABSTRACT

In one embodiment of the invention, a tree branch corset comprises a generally rectangular piece of fabric or other material, slightly gathered along the bottom edge thereof, and having a plurality of sets of mating fasteners attached along opposite side edges thereof. In use, the tree branch corset is generally positioned around the base of a growing tree, and the bottom several sets of mating fasteners are buckled around the trunk of the tree. The tree branch corset is then lifted into a somewhat funnel-shaped position around the tree while each subsequently higher set of the mating fasteners is in turn buckled, thereby progressively compressing the tree branches upward until the tree branch corset is completely in place, substantially covering and protectively embracing the branches of the growing tree in preparation for its being harvested. In another embodiment of the invention, a generally funnel-shaped tree corset fixture includes a plurality of sets of mating fasteners attached along opposite edges thereof and further includes a waistband section having a plurality of clips thereon for holding a tree branch corset in a vertically pleated position surrounding the waistband. A plurality of sets of mating fasteners attached to opposite edges of the tree branch corset are arranged to be generally simultaneously coupled after the tree branch corset has been placed in a position held by the plurality of clips so as to surround the waistband portion of the tree corset fixture. Installation of the tree branch corset is accomplished by buckling the corset holder fixture around the bottom of a growing tree, by then buckling the pleated tree branch corset in position under the plurality of clips and surrounding the waistband section of the corset holder fixture, and by then gradually lifting the corset holder fixture upward the length of the tree, thereby causing the pleated tree branch corset to gradually unpleat from under the plurality of clips, such that when the tree branch corset is totally unpleated it substantially covers and protectively embraces the branches of the growing tree.

4 Claims, 3 Drawing Sheets

U.S. Patent    Nov. 13, 1990    Sheet 1 of 3    4,969,555
FIG. 1
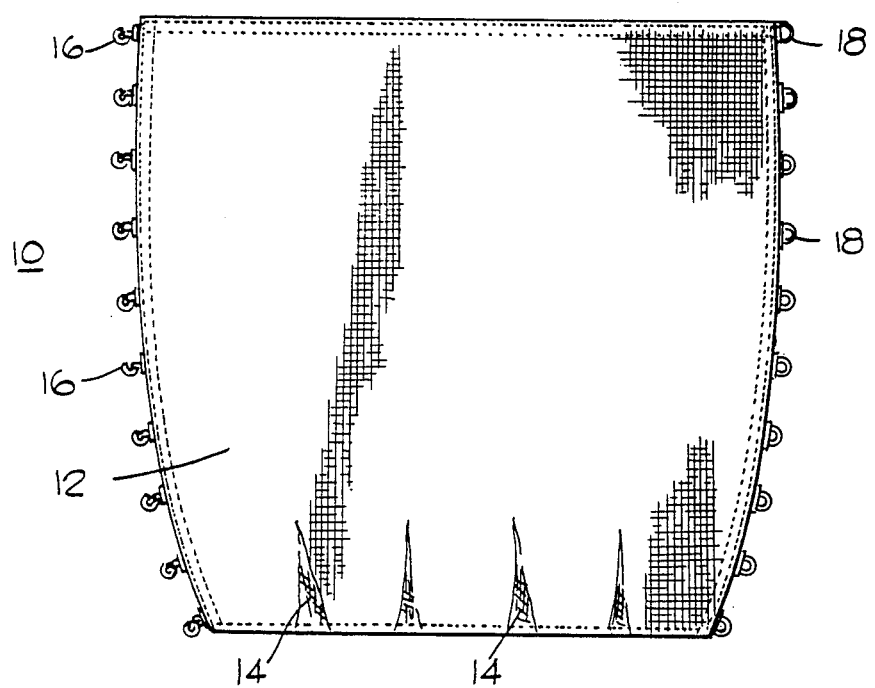
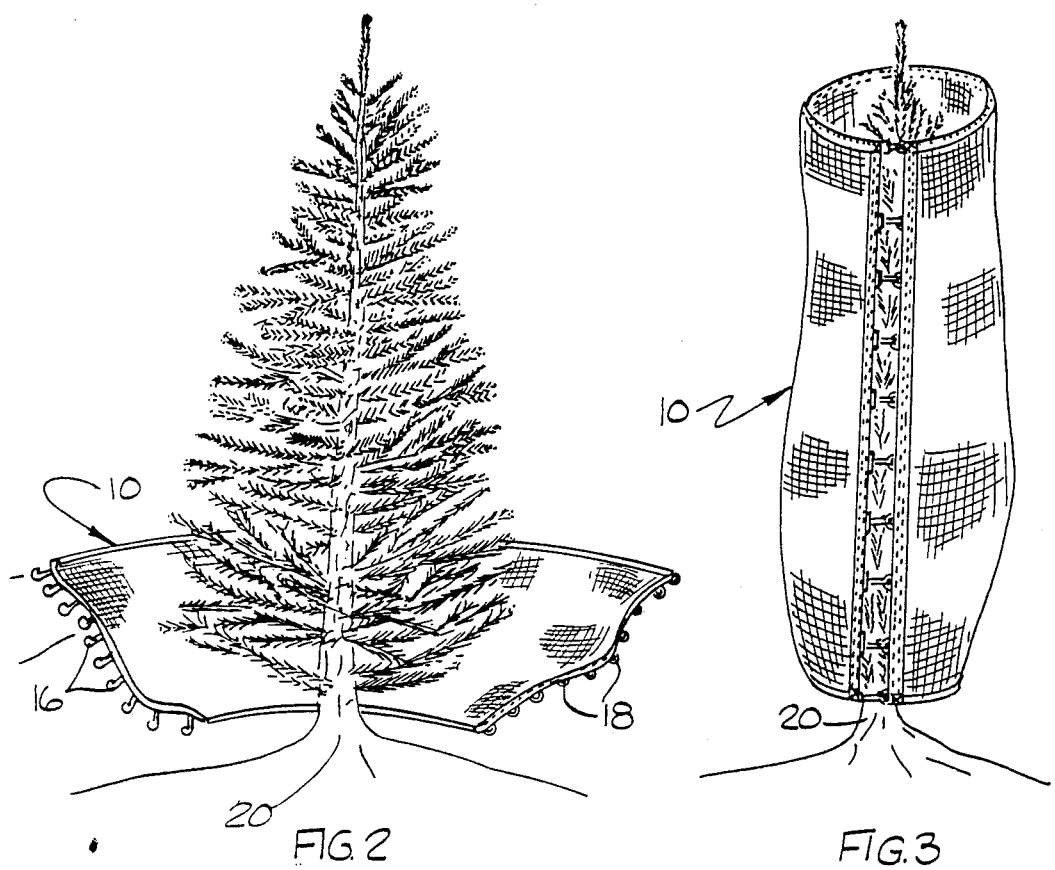
FIG. 2          FIG. 3

TREE BRANCH CORSET AND METHOD OF ATTACHMENT TO A GROWING TREE

BACKGROUND AND SUMMARY OF THE INVENTION

This invention relates to an apparatus and method for protecting the branches of trees in preparation for their subsequent harvesting and shipment. The branches of evergreen trees, in particular, must be protected from damage that would likely occur during harvesting for transplanting and shipment. This task is conventionally accomplished by the tedious task of manually wrapping each tree with twine in preparation for its removal from the earth in which it is growing. In the case of large wholesale nurseries, the trees remain tied and are shipped out. In the case of smaller nurseries and local landscape companies, the tied trees are moved to a different location, heeled in, and untied within a few days. Trees destined for customers of a retail nursery or landscape company are selected from a bin full of trees. Tied trees that have been moved to a bin are difficult to untie and retie because they are binned very close to each other. A tree selected for a customer from a bin must first be retied for the customer before it is loaded into his vehicle. On the other hand, trees selected for a landscape contractor are generally placed untied on a truck because of the difficulties encountered in tying binned trees. However, the untied trees take up considerably more space on the truck and are much more subject to damage in transport. The manual twine wrapping technique of the prior art is also disadvantageous in that it consumes tremendous amounts of twine that generally cannot be reused and therefore must be disposed of following unwrapping. Proper tying of a tree so as to prevent damage is also time consuming and requires skilled workmen. Even so, potential for damage exists at each point at which the twine crosses a branch. Finally, twine tying tends to deform the natural shape of a tree. Since trees are usually selected for their shape, a deformed appearance caused by bent or drooping branches contacted by twine is disappointing to the end customer.

It is therefore a principal object of the present invention to provide a greatly improved apparatus and method for protectively embracing the branches of growing trees that are to be removed from the earth and transported to other locations for transplanting. This and other objects of the invention are accomplished by providing alternative tree branch corsets that may be quickly and easily installed to substantially cover the tree branches and to naturally, compressively embrace them in a manner that does not result in a deformed appearance when the tree branch corset is later removed. In accordance with one illustrated embodiment of the present invention, a tree branch corset comprises a generally rectangular piece of cordura or other somewhat tightly woven fabric, slightly gathered along the bottom edge thereof, and having a plurality of sets of mating fasteners attached along the two side edges. The bottom several sets of mating fasteners are first buckled around the trunk of the tree. The tree branch corset is then lifted into a somewhat funnel-shaped position around the tree while each subsequently higher set of mating fasteners is in turn buckled, progressively compressing the tree branches upward until the tree branch corset is finally in place substantially covering and protectively embracing the branches of the tree. When desired, the tree branch corset may be quickly removed from the tree by simply unbuckling each of the sets of mating fasteners, at which point it is ready for use again on another tree. In accordance with an alternative illustrated embodiment of the present invention, a tree branch corset comprises a generally rectangular piece of inexpensive webbing or netting material that also includes a plurality of sets of mating fasteners attached along two opposite edges thereof. A generally funnel-shaped corset holder fixture holds the disposable tree branch corset in a vertically pleated position adjacent the trunk of the tree. The plurality of sets of mating fasteners are then simultaneously coupled and the corset holder fixture is then pulled upward, gradually unpleating the disposable tree branch corset until it is completely unpleated in position to protectively embrace substantially all of the branches of the tree.

BRIEF DESCRIPTION OF THE DRAWINGS

FIG. 1 illustrates a tree branch corset constructed in accordance with one embodiment of the present invention.

FIG. 2 illustrates the general positioning of the tree branch corset of FIG. 1 preparatory to installation around a growing tree.

FIG. 3 illustrates the tree branch corset of FIG. 1 in the fully buckled position protectively embracing the branches of a tree.

DESCRIPTION OF THE PREFERRED EMBODIMENTS

Figure 4:
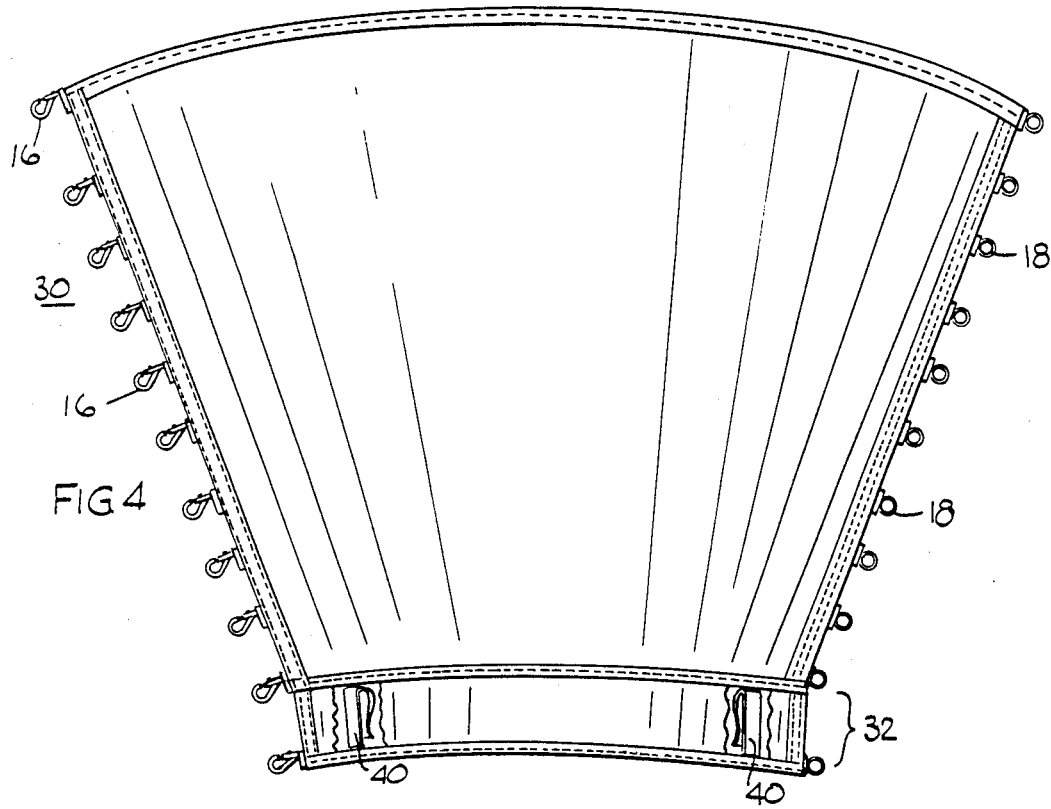
FIG. 4 illustrates a corset holder fixture that is employed to install a tree branch corset, constructed in accordance with an alternative embodiment of the present invention, around a growing tree.

Referring now to FIG. 1, there is shown a tree branch corset 10 constructed in accordance with one embodiment of the present invention. Tree branch corset 10 comprises a generally rectangular shaped piece of material 12 that has a number of gathers 14 at a bottom end thereof to generally narrow its shape at the bottom end. Material 12 may comprise any of a number of commercially available fabric or plastic-like materials. A relatively tightly woven fabric such as cordura has been found to be very workable for this purpose. A number of generally evenly spaced sets of mating fasteners 16, 18 are provided along each of the side edges of tree branch corset 10. Mating fasteners 16, 18 may comprise any of a number of commercially available fasteners such as zippers, velcro, D-ring snap connectors, etc. The sets of mating fasteners 16, 18 may be attached at the side edges of material 12 in any appropriate secure way, such as sewing. If desired, additional reinforcement material may be provided at the points of attachment of the sets of mating fasteners 16, 18.

In use, tree branch corset 10 is generally positioned around the base of a growing tree 20, as illustrated in FIG. 2. The bottom several sets of mating fasteners 16 and 18 are first buckled around the trunk of the tree. Tree branch corset 10 is then lifted into a somewhat funnel-shaped position around the tree while each subsequently higher set of mating fasteners 16, 18 is in turn buckled, thereby progressively compressing the tree branches until the tree branch corset is finally in place, as illustrated in FIG. 3, substantially covering and protectively embracing the branches of the growing tree in preparation for its being harvested.

Referring now to FIG. 4, there is shown a corset holder fixture 30 that is fabricated to take a generally funnel-shaped form when closed on itself. Corset holder fixture 30 includes a downwardly extending waistband section 32 at the bottom thereof. Corset holder fixture 30, like tree branch corset 10 of FIGS. 1–3, may be fabricated from any of a number of commercially available fabric or plastic-like materials, a preferred material being cordura. A number of generally evenly spaced sets of mating fasteners 16, 18, such as D-ring snap connectors, for example, are attached along each of the side edges of corset holder fixture 30, as illustrated in FIG. 4.

Figure 5:
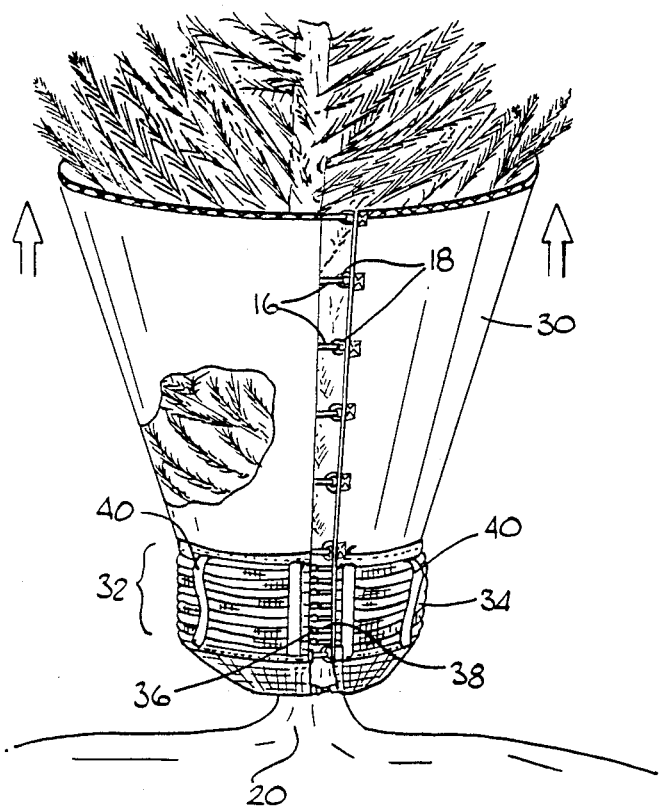
FIG. 5 illustrates the corset holder fixture of FIG. 4 with a vertically pleated tree branch corset clipped thereto preparatory to installation of the tree branch corset on a growing tree.
Figure 6:
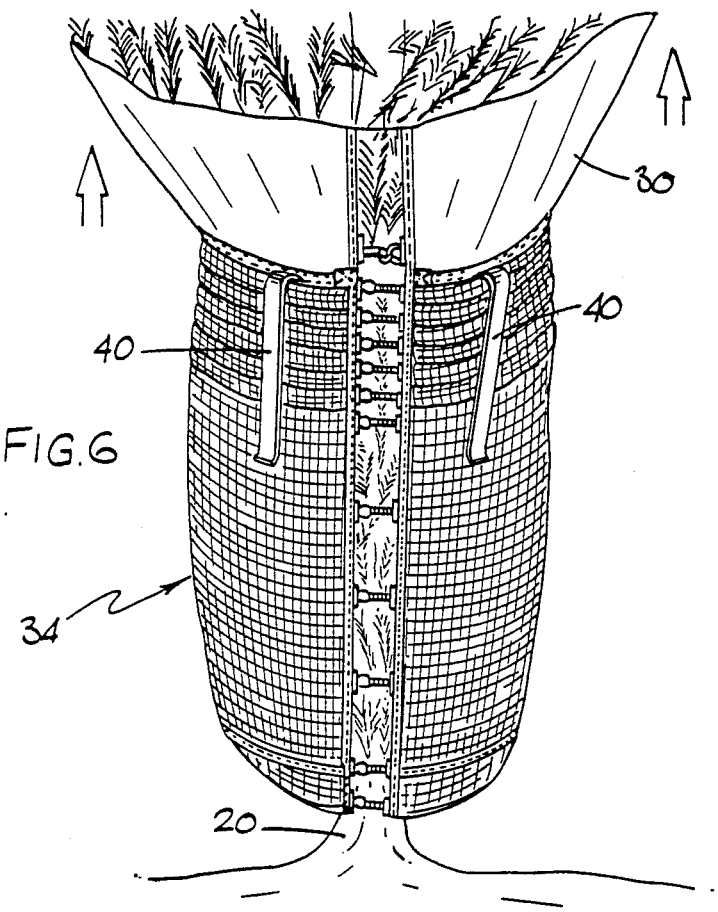
FIG. 6 illustrates the position of the corset holder fixture and the tree branch corset of FIGS. 4 and 5 at an intermediate point during the installation of the tree branch corset on a growing tree.
Figure 7:
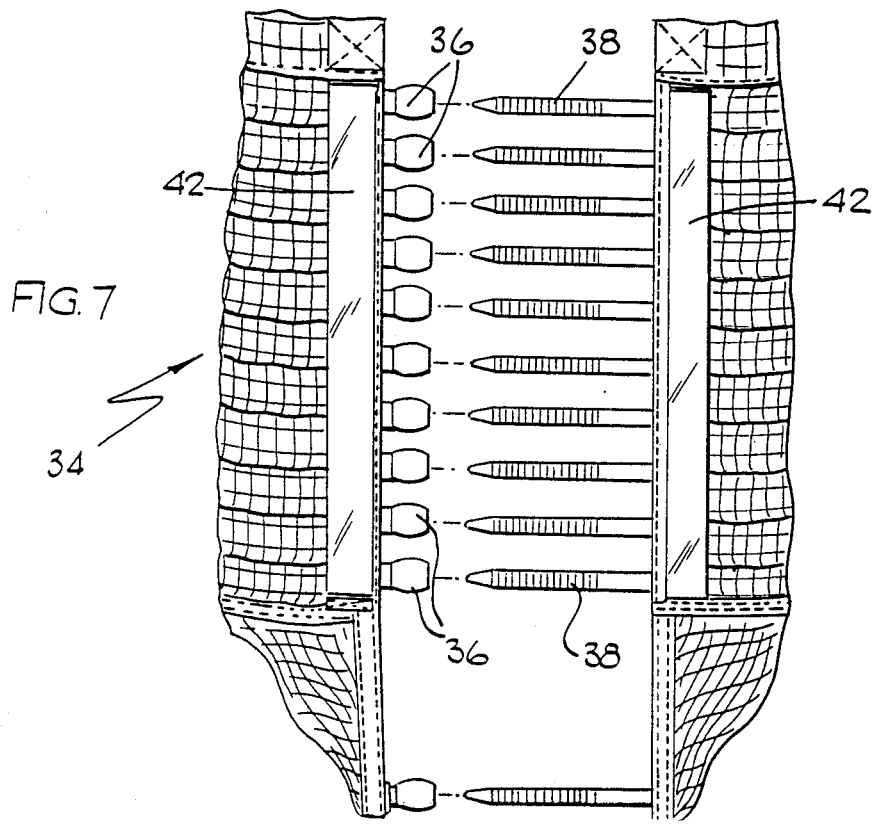
FIG. 7 illustrates a plurality of sets of mating fasteners as they are positioned when the tree branch corset of FIGS. 5 and 6 is in a vertically pleated position clipped to the corset holder fixture preparatory to installation on a growing tree.

In use, corset holder fixture 30 is buckled into position around a tree 20 with its waistband section 32 located adjacent the trunk of the tree. A tree branch corset 34, generally shaped like tree branch corset 10 of FIG. 1, but preferably fabricated of a lightweight mesh material, is vertically pleated and placed into a position surrounding waistband section 32 of corset holder fixture 30. A plurality of sets of mating fasteners 36, 38 attached to opposite edges of tree branch corset 34 are arranged, as illustrated in detail in FIG. 7, to be generally simultaneously coupled after the tree branch corset 34 has been placed in position over waistband section 32 of corset holder fixture 30. Mating fasteners 36, 38 may comprise any of a number of commercially available quick-connect fasteners such as electrical tie-wrap connectors, for example. Such fasteners are advantageous in that they may be quickly cut apart when tree branch corset 34 is to be removed from a tree. Mating fasteners 36, 38 are held in mating alignment prior to their connection to each other by a pair of removable retainers 42, as illustrated in FIG. 7. A number of clips 40 are attached in vertically depending position along the waistband section 32 of corset holder fixture 30 and serve to retain tree branch corset 34 in its vertically pleated position over waistband section 32 of corset holder fixture 30 prior to installation of tree branch corset 34 on growing tree 20. Installation of tree branch corset 34 is accomplished by buckling the corset holder fixture 30 around the bottom of a growing tree 20, by then buckling the pleated tree branch corset 34 in position under the plurality of clips 40 and surrounding the waistband section 32 of the corset holder fixture 30, and by then gradually lifting the corset holder upward the length of the tree, as illustrated in FIGS. 5 and 6, thereby causing the pleated tree branch corset 34 to gradually unpleat from under clips 40, such that when tree branch corset 34 is totally unpleated it substantially covers and protectively embraces the branches of the growing tree 20.

I claim:

1. A tree branch corset for compressively and protectively embracing the branches of a growing tree, the tree branch corset comprising:
    a four-sided piece of flexible material having parallel top and bottom edges and having tapered side edges such that said piece of flexible material is narrower at the bottom edge thereof said top and bottom edges corresponding in orientation to the top and bottom ends of said growing tree than at the top edge thereof; and
    a plurality of separate sets of mating fasteners attached in spaced apart relationship along said tapered side edges of said piece of flexible material, each one of said separate sets of mating fasteners being operative for attaching one of said tapered side edges to the other of said tapered side edges at the point of attachment of said each one of said separate sets of mating fasteners.

2. A method for compressively and protectively embracing the branches of a growing tree, the method comprising the steps of:
    providing a tree branch corset comprising a four-sided piece of flexible material, said piece of flexible material having parallel top and bottom edges and having tapered side edges such that said piece of flexible material is narrower at the bottom edge thereof said top and bottom edges corresponding in orientation to the top and bottom ends of said growing tree than at the top edge thereof, said tree branch corset further comprising a plurality of separate sets of mating fasteners attached in spaced apart relationship along said tapered side edges of said piece of flexible material;
    positioning said tree branch corset around the trunk of the growing tree and buckling at least the bottom set of mating fasteners while the tree branch corset is so positioned;
    lifting said tree branch corset into a somewhat funnel-shaped position around the growing tree; and
    buckling each subsquently higher set of mating fasteners, thereby progressively compressing the branches of the growing tree upward until all of the sets of mating fasteners have been buckled and the tree branch corset is in place substantially covering and protectively embracing the branches of the growing tree.

3. A tree branch corset system for compressively and protectively embracing the branches of a growing tree, the tree branch corset system comprising:
    a corset holder fixture comprising a piece of flexible material and having a plurality of sets of mating fasteners attached in spaced apart relationship along opposite side edges thereof, said corset holder fixture being fabricated to be generally funnel-shaped when said plurality of sets of mating fasteners are buckled, said corset holder fixture being further fabricated to include a waistband section proximate a bottom edge thereof, said waistband section further including a plurality of vertically depending clips attached thereto., and
    a generally rectangular tree branch corset having a plurality of sets of mating fasteners attached in spaced apart relationship along opposite side edges thereof, said tree branch corset being compressed into a vertically pleated position to surround said waistband section of said corset holder fixture when said plurality of sets of mating fasteners are buckled, said tree branch corset being held in said vertically pleated position underneath said vertically depending clips.

4. A method for compresively and protectively embracing the branches of a growing tree, the method comprising the steps of:

providing a corset holder fixture comprising a piece of flexible material and having a plurality of sets of mating fasteners attached in spaced apart relationship along opposite side edges thereof, said corset holder fixture being fabricated to be generally funnel-shaped when said plurality of sets of mating fasteners are buckled, said corset holder fixture being further fabricated to include a waistband section proximate a bottom edge thereof, said waistband section further including a plurality of vertically depending clips attached thereto;

providing a generally rectangular tree branch corset having a plurality of sets of mating fasteners attached in spaced apart relationship along opposite side edges thereof, said tree branch corset being compressed into a vertically pleated position to surround said waistband section of said corset holder fixture when said plurality of sets of mating fasteners are buckled, said tree branch corset being held in said vertically pleated position underneath said vertically depending clips;

buckling said corset holder fixture in a position around the bottom of the growing tree;

buckling the pleated tree branch corset in a position under said plurality of clips and surrounding said waistband section of said corset holder fixture;

gradually lifting said corset holder fixture upward the length of the tree, thereby causing the pleated tree branch corset to gradually unpleat from under the plurality of clips, such that when the tree branch corset is totally unpleated it substantially covers and protectively embraces the branches of the growing tree.

* * * * *